United States Patent
Liao et al.

(10) Patent No.: US 6,481,473 B2
(45) Date of Patent: Nov. 19, 2002

(54) APPARATUS FOR DISCHARGING SHAVINGS THAT ARE GENERATED DURING OPERATION OF A WOOD PLANING MACHINE

(75) Inventors: Juei-Seng Liao, No. 295, Sec. 1, Nanking E.Rd., Taichung City (TW); Pei-Lieh Chiang, Taichung (TW)

(73) Assignee: Juei-Seng Liao, Taichung City (TW)

( * ) Notice: Subject to any disclaimer, the term of this patent is extended or adjusted under 35 U.S.C. 154(b) by 0 days.

(21) Appl. No.: 09/848,455

(22) Filed: May 2, 2001

(65) Prior Publication Data

US 2002/0134465 A1 Sep. 26, 2002

(30) Foreign Application Priority Data

Mar. 21, 2001 (TW) .......................................... 090204277

(51) Int. Cl.[7] .......................... B27G 21/00; B27G 19/00
(52) U.S. Cl. ................... 144/252.1; 15/314; 144/114.1; 144/117.1; 409/137; 451/456
(58) Field of Search ................................ 15/312.2, 314; 144/114, 117.1, 129, 130, 252.1; 407/134, 137; 83/100; 451/453, 456

(56) References Cited

U.S. PATENT DOCUMENTS 6,293,321 B1 * 9/2001 Chiang ..................... 144/252.1

* cited by examiner

Primary Examiner—W. Donald Bray
(74) Attorney, Agent, or Firm—Christie, Parker & Hale, LLP

(57) ABSTRACT

An apparatus is adapted for discharging wood shavings that are generated during operation of a wood planing machine. The wood planing machine includes a machine base, a cutter support, a rotary cutter, and a drive unit. The apparatus includes a fan unit and a shavings collecting box. The fan unit includes a fan housing, a fan blade, and a drive shaft. The shavings collecting box has an open top disposed below a discharge hole in the cutter support so as to receive the wood shavings that fall therethrough, a closed bottom, and a lateral wall formed with an outlet port adjacent to the closed bottom. The rotation of the fan blade in the blade chamber causes the wood shavings that fall into the box to be drawn into the blade chamber via the outlet port and an inlet port in the fan housing and to be subsequently discharged through a discharge tube in the fan housing.

6 Claims, 6 Drawing Sheets

APPARATUS FOR DISCHARGING SHAVINGS THAT ARE GENERATED DURING OPERATION OF A WOOD PLANING MACHINE

CROSS-REFERENCE TO RELATED APPLICATION

This application claims priority of Taiwan patent Application No. 090204277, filed on Mar. 21, 2001.

BACKGROUND OF THE INVENTION

1. Field of the Invention

The invention relates to a wood planing machine, more particularly to an apparatus for discharging wood shavings that are generated during operation of a wood planing machine.

2. Description of the Related Art

A conventional wood planing machine includes a machine base, a cutter support mounted on top of the machine base, a rotary cutter mounted rotatably on the cutter support, and a drive unit for driving rotatably the rotary cutter. The cutter support is formed with a discharge hole to permit wood shavings that are generated during operation of the machine to fall therethrough.

In the conventional wood planing machine, the wood shavings accumulate on the floor at the vicinity of the machine. Thus, the wood shavings can affect adversely the health of operators of the machine, create a dirty working environment, and can be a fire hazard when left unattended on the floor.

SUMMARY OF THE INVENTION

Therefore, the main object of the present invention is to provide an apparatus for discharging wood shavings that are generated during operation of a wood planing machine.

Accordingly, the apparatus of the present invention is adapted for discharging wood shavings that are generated during operation of a wood planing machine. The wood planing machine includes a machine base, a cutter support mounted on top of the machine base, a rotary cutter mounted rotatably on the cutter support, and a drive unit for driving rotatably the rotary cutter. The cutter support is formed with a discharge hole to permit the wood shavings to fall therethrough. The apparatus comprises a fan unit and a shavings collecting box. The fan unit includes a fan housing, a fan blade, and a drive shaft. The fan housing is adapted to be mounted on a bottom side of the cutter support, confines a blade chamber, and is formed with an inlet port and a discharge tube that are communicated with the blade chamber. The fan blade is rotatably disposed in the blade chamber. The drive shaft has one end secured to the fan blade for driving rotation of the fan blade in the blade chamber. The shavings collecting box is coupled to the fan housing, and has an open top to be disposed below the discharge hole in the cutter support so as to be adapted to receive the wood shavings that fall therethrough, a closed bottom, and a lateral wall formed with an outlet port adjacent to the closed bottom. The outlet port is aligned and communicated with the inlet port of the fan housing. Rotation of the fan blade in the blade chamber causes the wood shavings that fall into the box to be drawn into the blade chamber via the outlet and inlet ports and to be subsequently discharged through the discharge tube.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
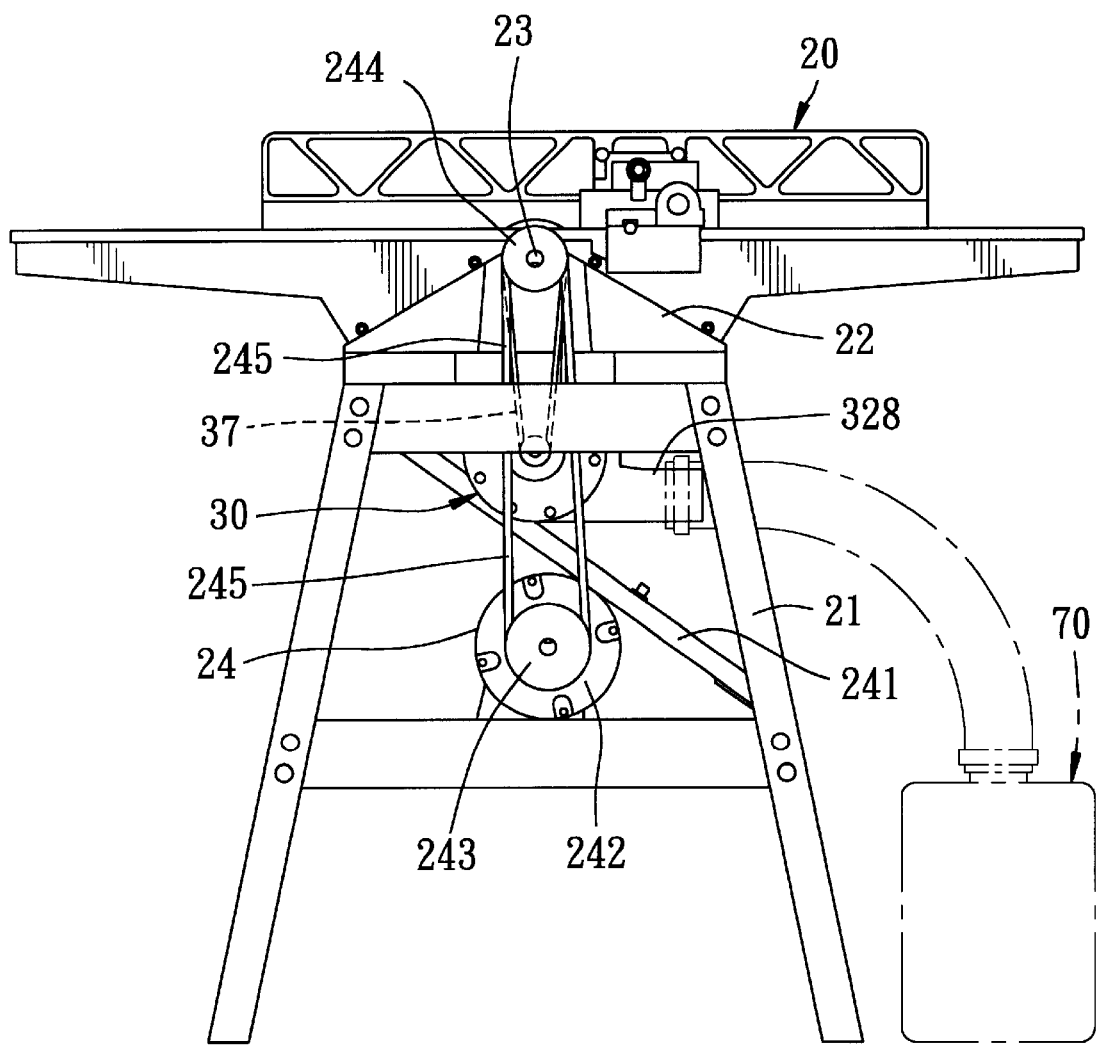
FIG. 1 is a schematic view of a wood planing machine that incorporates the preferred embodiment of the apparatus for discharging wood shavings according to the present invention.
Figure 2:
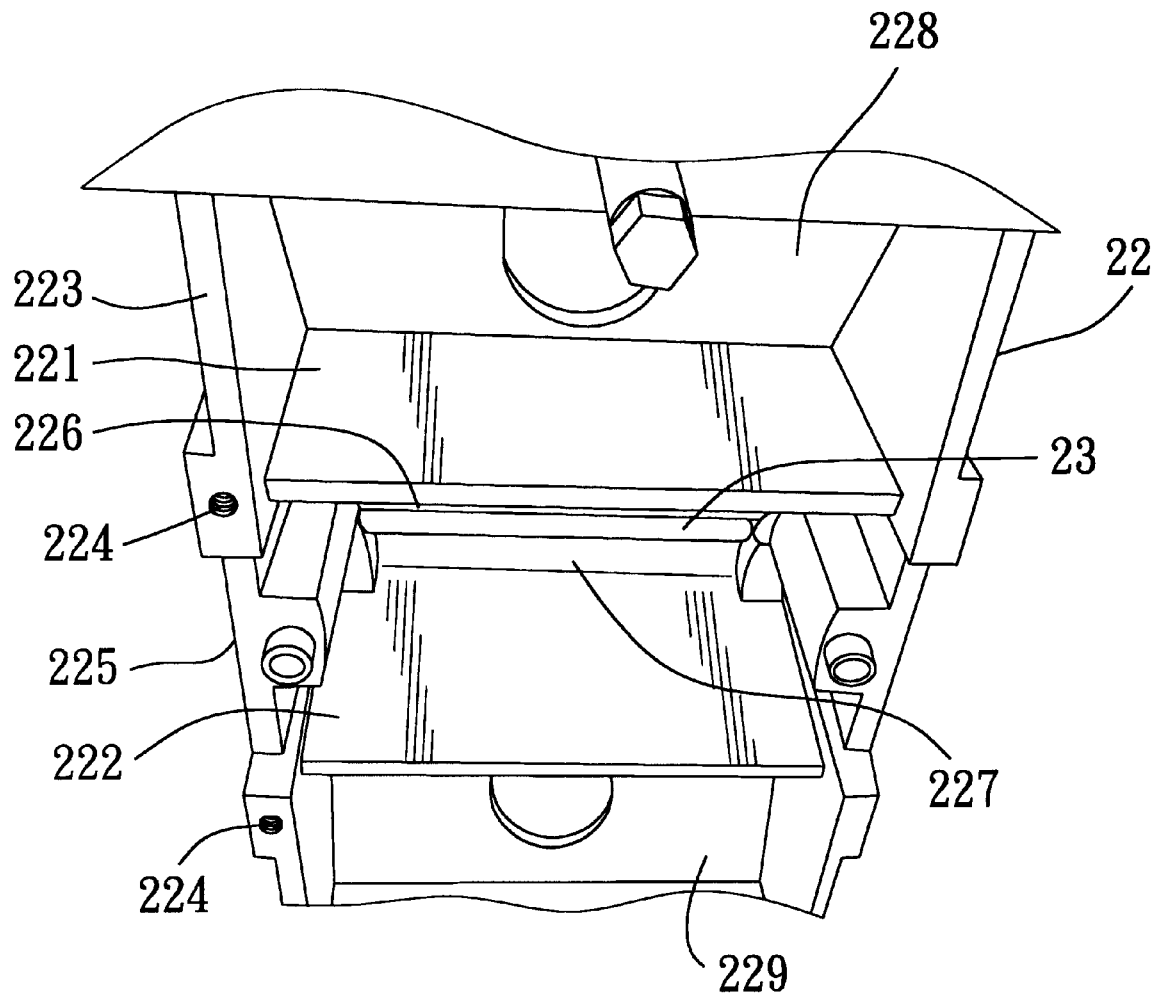
FIG. 2 is a fragmentary bottom perspective view of a cutter support of the machine of FIG. 1.
Figure 3:
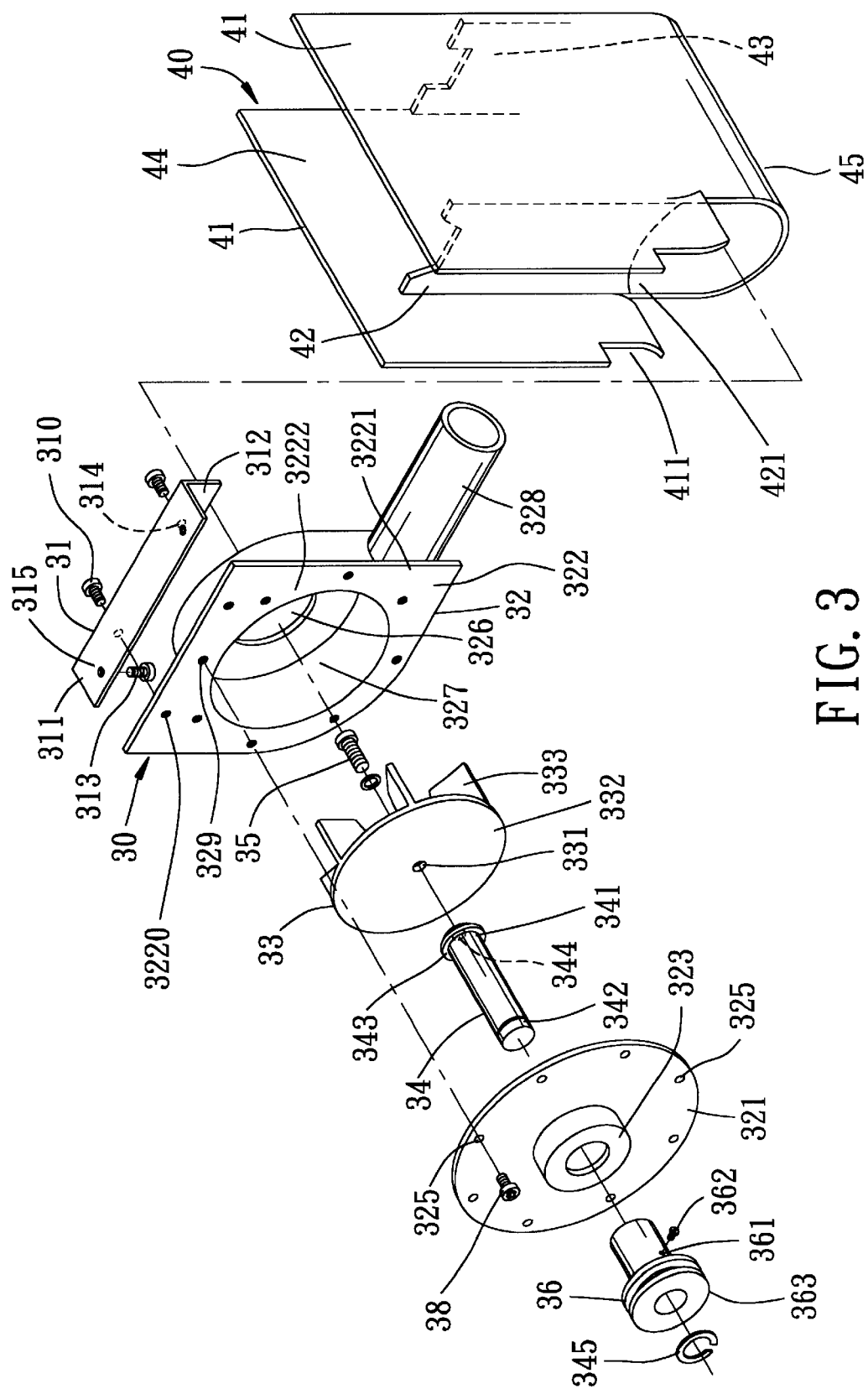
FIG. 3 is an exploded perspective view of the preferred embodiment.
Figure 4:
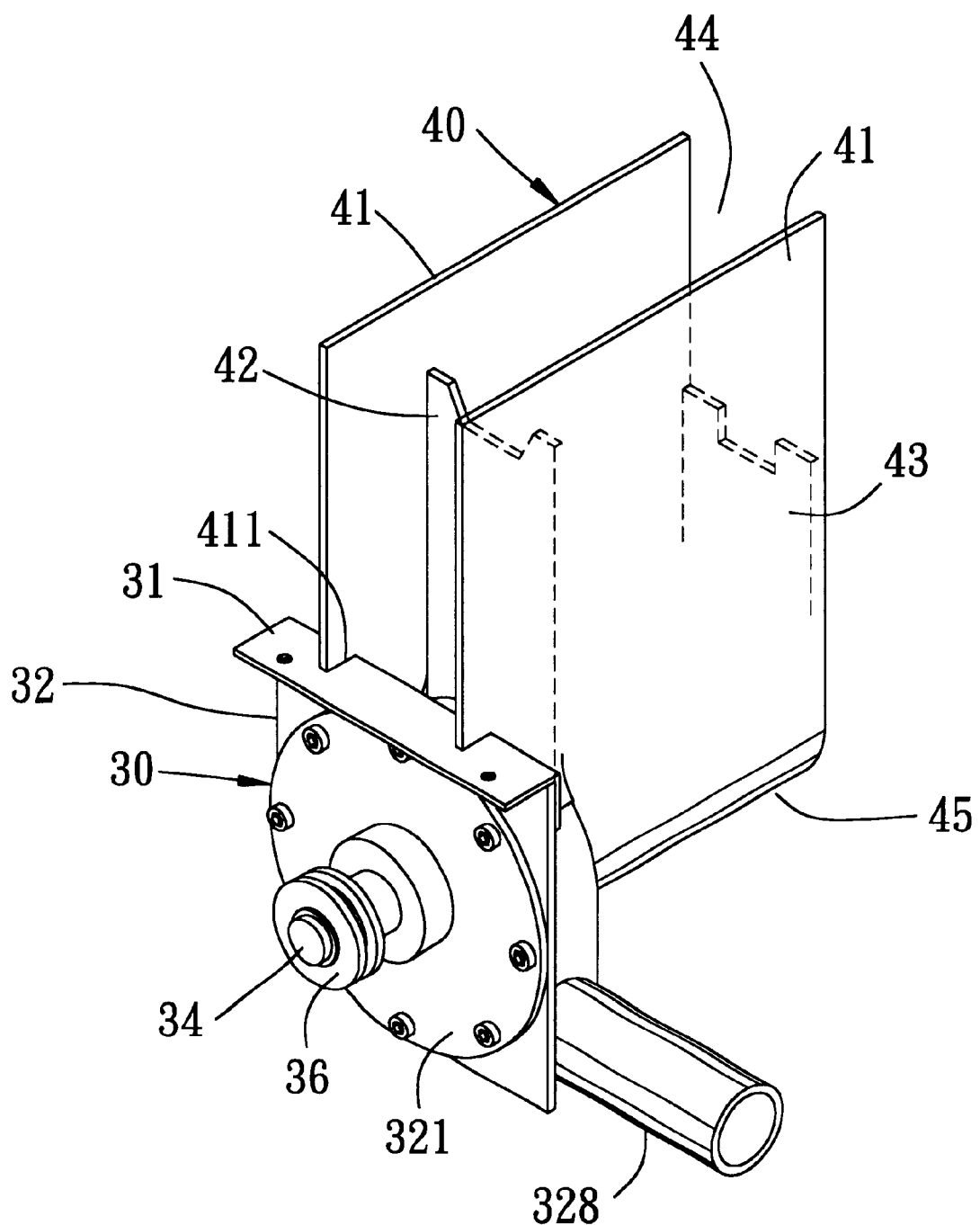
FIG. 4 is an assembled perspective view of the preferred embodiment.

Referring to FIG. 1, the preferred embodiment of the apparatus of the present invention is shown to be adapted for discharging wood shavings that are generated during operation of a wood planing machine 20. The wood planing machine 20, which has a conventional construction, includes a machine base 21, a cutter support 22 mounted on top of the machine base 21, a rotary cutter 23 mounted rotatably on the cutter support 22, and a drive unit 24 for driving rotatably the rotary cutter 23. The cutter support 22, as illustrated in FIG. 2, has a bottom portion 223 separated into three compartments 227, 228, 229 by two partition plates 221, 222, a bottom side 225 formed with screw holes 224, and a discharge hole 226 that is communicated with the middle compartment 227 to permit the wood shavings to fall therethrough. The drive unit 24, as shown in FIG. 1, includes a motor member 242 secured on a motor mounting frame 241 of the machine base 21, and a belt member 245 for coupling a driving pulley 243 of the motor member 242 to a driven pulley 244 of the rotary cutter 23.

As illustrated in FIGS. 1, 3, 4, and 5, the preferred embodiment of the apparatus of the present invention includes a fan unit 30 and a shavings collecting box 40. The fan unit 30 includes a fan housing 32, a fan blade 33, and a drive shaft 34. The fan housing 32 is mounted on the bottom side 225 of the cutter support 22, confines a blade chamber 327, and is formed with an inlet port 326 and a discharge tube 328 that are communicated with the blade chamber 327. The discharge tube 328 extends along a tube axis that is offset from and that is transverse to a hole axis of the inlet port 326. The fan housing 32 has an open side 322 opposite to the inlet port 326. The open side 322 is formed with a wall 3221 having a plurality of radial screw holes 329 and an opening 3222 for access to the blade chamber 327. An L-shaped bracket 31 has a horizontal portion 311 with screw holes 315 and a vertical portion 312 with a plurality of screw holes 314. The bracket 31 is mounted on an upper end of the wall 3221 via screws 310 that pass through the screw holes 314 in the vertical portion 312 and that engage the screw holes 3220 in the wall 3221. The fan blade 33 is rotatably disposed in the blade chamber 327, and is formed with a circular plate 332 having a through-hole 331 and a plurality of radial outward blade portions 333 on one side. The drive shaft 34 has one end 341 secured to the fan blade 33 for driving rotation of the fan blade 33 in the blade chamber 327 via a screw 35 that passes through the through-hole 331 in the fan blade 33 and that engages a screw hole 344 in one end 341 of the drive shaft 34. The fan unit 30 further includes a cover plate 321 and a bearing member 324. The cover plate 321 is mounted on the fan housing 32 to close the open side 322 of the fan housing 32 via screw means 38 that pass through screw holes 325 in the cover plate 321 and that engage the screw holes 329 in the wall 3221. The drive shaft 34 further has an opposite end 342 extending through the cover plate 321. The bearing member 324 is mounted on a bearing receiving seat 323 of the cover plate 321 and mounts rotatably the drive shaft 34 on the cover plate 321. A limiting ring 343 on one end 341 of the drive shaft 34 abuts against the bearing member 324. The shavings collecting box 40 is coupled to the fan housing 32 and is formed as a generally U-shaped body. The box 40 has an open top 44 tobe disposedbelow the discharge hole 226 in the cutter support 22 so as to be adapted to receive the wood shavings that fall therethrough, a closed bottom 45, a first lateral wall 42 formed with an outlet port 421 adjacent to the closed bottom 45, and a second lateral wall 43 opposite to the first lateral wall 42. The box 40 further has parallel plate portions 41, each of which is formed with a notched section 411 to receive the fan housing 32 such that the outlet port 421 is aligned and communicated with the inlet port 326 of the fan housing 32. Therefore, rotation of the fan blade 33 in the blade chamber 327 can cause the wood shavings that fall into the box 40 to be drawn into the blade chamber 327 via the outlet and inlet ports 421, 326 and to be subsequently discharged through the discharge tube 328 for collection in a trash box 70. During assembly, after the shavings collecting box 40 has been coupled to the fan housing 32, the shavings collecting box 40 and the fan unit 30 are secured in the middle compartment 227 of the cutter support 22 via screw means 313 that pass through the screw holes 315 in the horizontal portion 311 of the bracket 31 and that engage the screw holes 224 in the bottom side 225 of the cutter support 22.

The apparatus of the present invention further includes a transmission unit 36 which is adapted to couple the drive shaft 34 to the rotary cutter 23 for transmitting rotary power from the rotary cutter 23 to the drive shaft 34. The transmission unit 36 includes a pulley 363 mounted securely on the opposite end 342 of the drive shaft 34 via a locking ring 345, and an endless belt 37 adapted for coupling the pulley 363 to the rotary cutter 23. A screw 362 passes through a screw hole 361 in the pulley 363 so as to abut against the opposite end 342 of the drive shaft 34, thereby retaining the pulley 363 on the drive shaft 34. It should be noted that the transmission unit 36 can be modified to couple the drive shaft 34 to the drive unit 24 instead of the rotary cutter 23.

Figure 5:
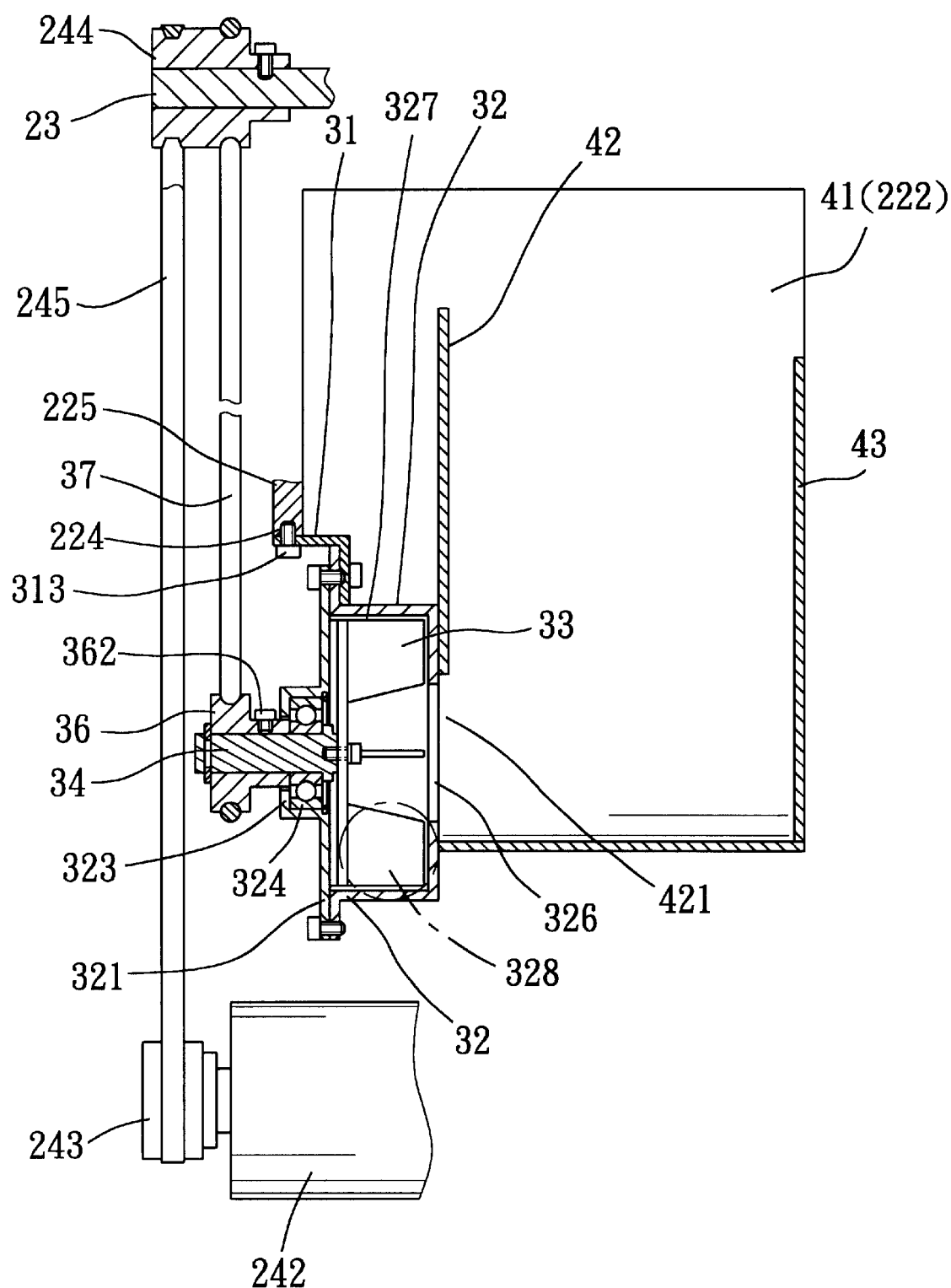
FIG. 5 is a fragmentary cross-sectional side view of the preferred embodiment.
Figure 6:
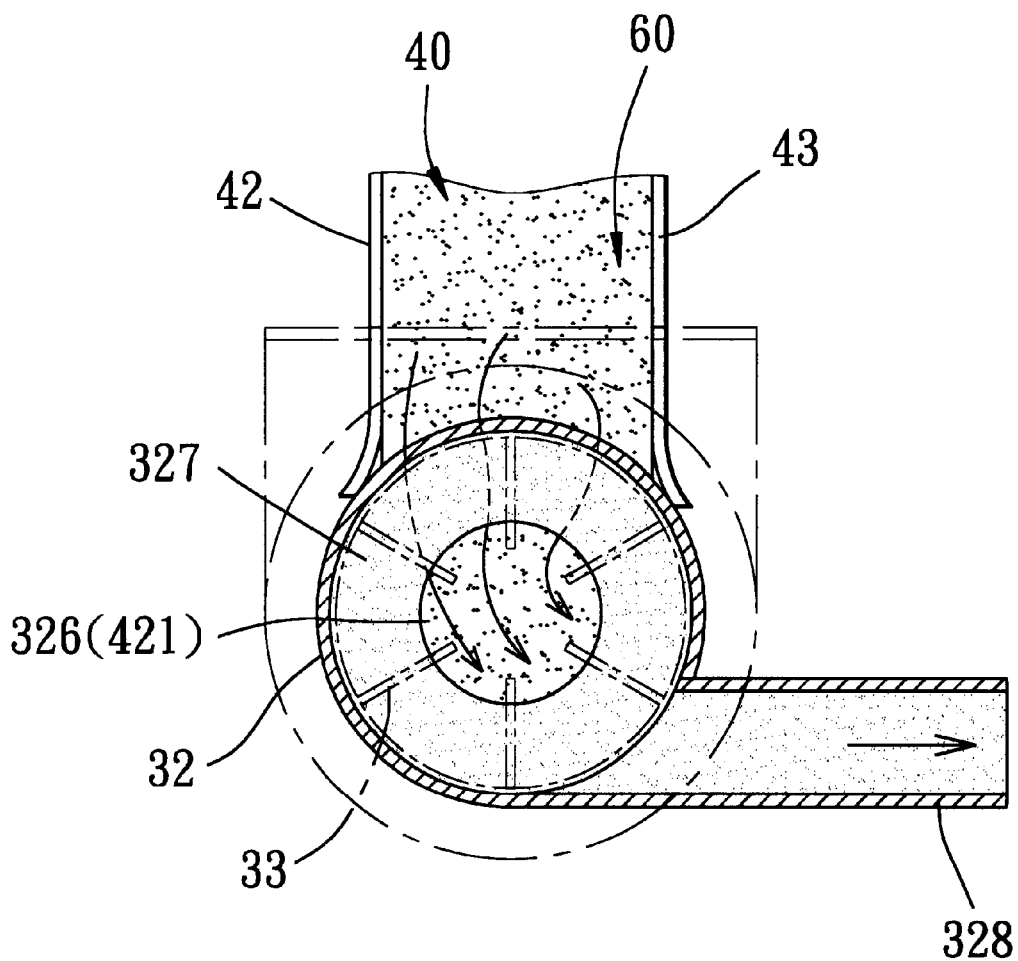
FIG. 6 is a fragmentary cross-sectional view of the preferred embodiment, illustrating how wood shavings are drawn by the rotation of a fan blade into a blade chamber and are discharged through a discharge tube.

In use, referring to FIGS. 1, 5 and 6, when the drive unit 24 of the wood planing machine 20 is activated, the motor member 242 drives the rotary cutter 23 to rotate via the belt member 245, and the rotary cutter 23 in turn drives the drive shaft 34 and thus the fan blade 33 of the fan unit 30 to rotate via the endless belt 37 at the same time. The wood shavings 60 that are generated during operation of the machine 20 fall from the discharge hole 226 in the cutter support 22 into the shavings collecting box 40. By virtue of the rotation of the fan blade 33 in the blade chamber 326, the wood shavings 60 in the box 40 are drawn into the blade chamber 326 via the outlet and inlet ports 421, 326 and are subsequently discharged through the discharge tube 328 for collection in the trash box 70. Since the wood shavings 60 accumulate in the trash box 70 and not on the floor, a clean, healthy and safe working environment can be ensured.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

We claim:

1. An apparatus for discharging wood shavings that are generated during operation of a wood planing machine, the wood planing machine including a machine base, a cutter support mounted on top of the machine base, a rotary cutter mounted rotatably on the cutter support, and a drive unit for driving rotatably the rotary cutter, the cutter support being formed with a discharge hole to permit the wood shavings to fall therethrough, said apparatus comprising:

a fan unit including
a fan housing adapted to be mounted on a bottom side of the cutter support, said fan housing confining a blade chamber and being formed with an inlet port and a discharge tube that are communicated with said blade chamber,
a fan blade rotatably disposed in said blade chamber, and
a drive shaft having one end secured to said fan blade for driving rotation of said fan blade in said blade chamber; and
a shavings collecting box coupled to said fan housing, said box having an open top to be disposed below the discharge hole in the cutter support so as to be adapted to receive the wood shavings that fall therethrough, a closed bottom, and a lateral wall formed with an outlet port adjacent to said closed bottom, said outlet port being aligned and communicated with said inlet port of said fan housing;
rotation of said fan blade in said blade chamber causing the wood shavings that fall into said box to be drawn into said blade chamber via said outlet and inlet ports and to be subsequently discharged through said discharge tube.

2. The apparatus of claim 1, wherein said discharge tube extends along a tube axis that is offset from and that is transverse to a hole axis of said inlet port.

3. The apparatus of claim 1, further comprising a transmission unit adapted to couple said drive shaft to one of the rotary cutter and the drive unit for transmitting rotary power from said one of the rotary cutter and the drive unit to said drive shaft.

4. The apparatus of claim 1, wherein said fan housing has an open side opposite to said inlet port, said fan unit further including:

a cover plate mounted on said fan housing to close said open side, said drive shaft further having an opposite end extending through said cover plate; and
a bearing member mounted on said cover plate for mounting rotatably said drive shaft on said cover plate.

5. The apparatus of claim 4, further comprising a transmission unit adapted to couple said drive shaft to one of the rotary cutter and the drive unit for transmitting rotary power from said one of the rotary cutter and the drive unit to said drive shaft.

6. The apparatus of claim 5, wherein said transmission unit includes a pulley mounted securely on said opposite end of said drive shaft, and an endless belt adapted for coupling said pulley to said one of the rotary cutter and the drive unit.

* * * * *